United States Patent
Collins et al.

(10) Patent No.: US 6,377,314 B1
(45) Date of Patent: Apr. 23, 2002

(54) METHODS AND APPARATUS FOR TRANSMITTING ANALOG AND DIGITAL INFORMATION SIGNALS

(75) Inventors: Fredrick P. Collins, Edgartown; Michael C. Payne, North Andover; Bruce A. Sokolik, Bedford, all of MA (US)

(73) Assignee: RF Technology, Inc.

( * ) Notice: Subject to any disclaimer, the term of this patent is extended or adjusted under 35 U.S.C. 154(b) by 0 days.

(21) Appl. No.: 09/126,946

(22) Filed: Jul. 31, 1998

(51) Int. Cl.[7] .................................................. H04N 7/18
(52) U.S. Cl. ........................ 348/723; 375/723; 375/725
(58) Field of Search ................................. 348/723, 487, 348/473, 486, 555, 461, 584, 484, 725

(56) References Cited

U.S. PATENT DOCUMENTS

| | | | |
|---|---|---|---|
| 5,327,245 A | * | 7/1994 | Unetich et al. ............. 348/723 |
| 5,532,748 A | | 7/1996 | Naimpally ................... 348/432 |
| 5,557,333 A | | 9/1996 | Jungo et al. ................. 348/473 |
| 5,774,193 A | | 6/1998 | Vaughan ..................... 333/117 |
| 6,061,096 A | * | 5/2000 | Limberg ..................... 348/555 |
| 6,091,932 A | * | 7/2000 | Langlais ...................... 348/13 |
| 6,166,774 A | * | 12/2000 | Plonka ........................ 348/487 |

* cited by examiner

*Primary Examiner*—Andy Rao
(74) *Attorney, Agent, or Firm*—ReedSmith LLP; Thomas J. McWilliams

(57) ABSTRACT

Transmitting an analog information signal, such as a standard analog television signal, with a digital information signal, such as a high or standard definition television signal, in single channel. A transmitter processes and band limits the analog information signal to have its own carrier signal and fit within one portion of the channel. The transmitter also processes the digital information signal to have its own carrier signal in another portion of the channel. The processed analog and digital information signals are added together and converted for RF transmission as a common transport signal.

61 Claims, 12 Drawing Sheets

IF TRANSLATOR (RX)

METHODS AND APPARATUS FOR TRANSMITTING ANALOG AND DIGITAL INFORMATION SIGNALS

FIELD OF THE INVENTION

The present invention relates to methods and apparatus for transmitting analog and digital information signal; within a particular frequency bandwidth.

BACKGROUND OF THE INVENTION

Television broadcasters transmit standard analog television signals over channels regulated by the Federal Communications Commission (FCC). These signals conform to the requirements of the National Television Standards Committee (NTSC), administered by the FCC, and the signals are thus referred to as NTSC analog television signals. The current NTSC standard requires transmission of 525 lines of resolution transmitted as 30 interlaced frames per second (60 half frames per second). The FCC permits transmission of NTSC analog television signals over channels having a 25 megahertz bandwidth, an industry standard.

Recently, broadcasters have had a need to transmit digital television signals with the advent of high definition television (HDTV) and standard definition television (SDTV). These digital television signals are known as HDTV signals and SDTV signals, both of which conform to known industry standards. Obtaining additional bandwidth to transmit digital television signals can be difficult. Expanding a standard 25 megahertz channel is not be possible, at least since another channel likely exists adjacent the channel, and expansion of one channel would cause interference with another. Also, due to a limited number of channels available in the radio frequency (RF) spectrum used for transmission of television signals, broadcasters may have difficulty obtaining additional channels.

Therefore, a technique has been developed to transmit both analog and digital television signals within a standard 25 megahertz channel. This technology involves digitizing an NTSC analog television signal, combining it with an HDTV signal, and transmitting both as one digital signal centered on a carrier signal. However, digitizing an NTSC analog television signal often adversely affect its picture quality, resulting in what are referred to as "artifacts" in the picture. In addition, digitizing NTSC analog television signals tends to adversely affects picture quality in panning, involving moving the camera at least horizontally to record an event such as often occurs in recording sporting events.

Furthermore, NTSC analog television signals have precise timing requirements that can be difficult to maintain when digitizing the signals. The timing requirements avoid, for example, delays or overlap between program broadcasts, commercials, and a broadcasters identifying logo, all of which may arrive from different sources and thus must be precisely timed to generate a continuous uninterrupted picture. As a result, the technology required to digitize NTSC analog signals and combine them with HDTV signals can require a significant amount of processing capability and expensive components.

Accordingly, a need exists for transmitting analog television or information signals with digital television or information signals in the same bandwidth without significantly affecting the picture quality of the analog television signals.

SUMMARY OF THE INVENTION

A first method consistent with the present invention transmits combined analog and digital information signals. The method includes receiving an analog information signal and a digital information signal. The analog and digital information signals are combined for transmission within a particular frequency bandwidth while maintaining the analog information signal in analog form.

A second method consistent with the present invention transmits combined analog and digital information signals. The method includes receiving an analog information signal and a digital information signal. The analog and digital information signals are combined for transmission within a particular frequency bandwidth using a first carrier signal for the analog information signal and using a second carrier signal for the digital information signal.

A third method consistent with the present invention receives combined analog and digital information signals. The method includes receiving a signal, transmitted within a particular frequency bandwidth, having a first portion including an analog information signal maintained in analog form and having a second portion including a digital information signal. The analog information signal is separated from the digital information signal.

A fourth method consistent with the present invention receives combined analog and digital information signals. The method includes receiving a signal, transmitted within a particular frequency bandwidth, having a first portion including an analog information signal transmitted using a first carrier signal and having a second portion including a digital information signal transmitted using a second carrier signal. The analog information signal is separated from the digital information signal.

A first apparatus consistent with the present invention transmits combined analog and digital information signals. A first terminal receives an analog information signal, and a second terminal receives a digital information signal. A transmitter, coupled to the first and second terminals, combines the analog information signal and the digital information signal for transmission within a particular frequency bandwidth while maintaining the analog information signal in form.

A second apparatus consistent with the present invention receives a combined analog and digital information signal. A terminal receives a signal, transmitted within a particular frequency bandwidth, having a first portion including an analog information signal maintained in analog form and having a second portion including a digital information signal. A receiver, coupled to the terminal, separates the analog information signal from the digital information signal.

A third apparatus consistent with the present invention transmits combined analog and digital information signals. A first terminal receives an analog information signal, and a second terminal receives a digital information signal. A transmitter, coupled to the first and second terminals, combines the analog information signal and the digital information signal for transmission within a particular frequency bandwidth using a first carrier signal for the analog information signal and using a second carrier signal for the digital information signal.

A fourth apparatus consistent with the present invention receives combined analog and digital information signals. A terminal receives a signal, transmitted within a particular frequency bandwidth, having a first portion including an analog information signal transmitted using a first carrier signal and having a second portion including a digital information signal transmitted using a second carrier signal. A receiver, coupled to the terminal, separates the analog information signal from the digital information signal.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Overview

Figure 1:
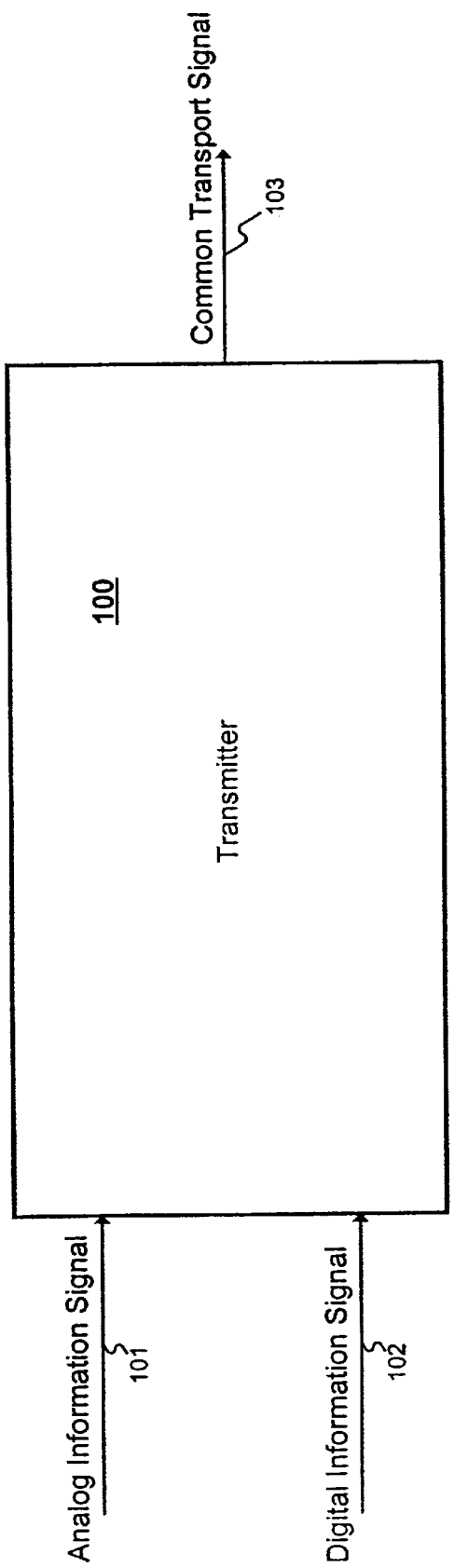
FIG. 1 is a diagram of a transmitter for transmitting analog and digital information signals consistent with the present invention.

FIG. 1 is a diagram of a transmitter 100 for transmitting analog and digital information signals consistent with the present invention. Transmitter 100 receives on terminal 101 one or more analog information signals, receives on terminal 102 one or more digital information signals, and converts them to a composite transport signal on terminal 103 for transmission, typically as an RF signal. Transmitter 100 provides an advantage of maintaining analog information signals in analog form, thus avoiding, for example, digitizing the signals in order to transmit them with the digital information signals. In addition, transmitter 100 typically uses two carrier signals, one for the analog information signal and another for the digital information signal.

Transmitter 100 transmits common transport signal on terminal 103 within a particular frequency bandwidth. For example, it may transmit the common transport signal within a standard channel bandwidth for transmission of television signals, currently 25 megahertz. Therefore, transmitter 100 permits broadcasters to transmit digital information signals, such as HDTV, SDTV, or data, in addition to analog television signals, meaning that the broadcaster may include additional signals without requiring additional channels or expansion of a current channel.

Figure 2:
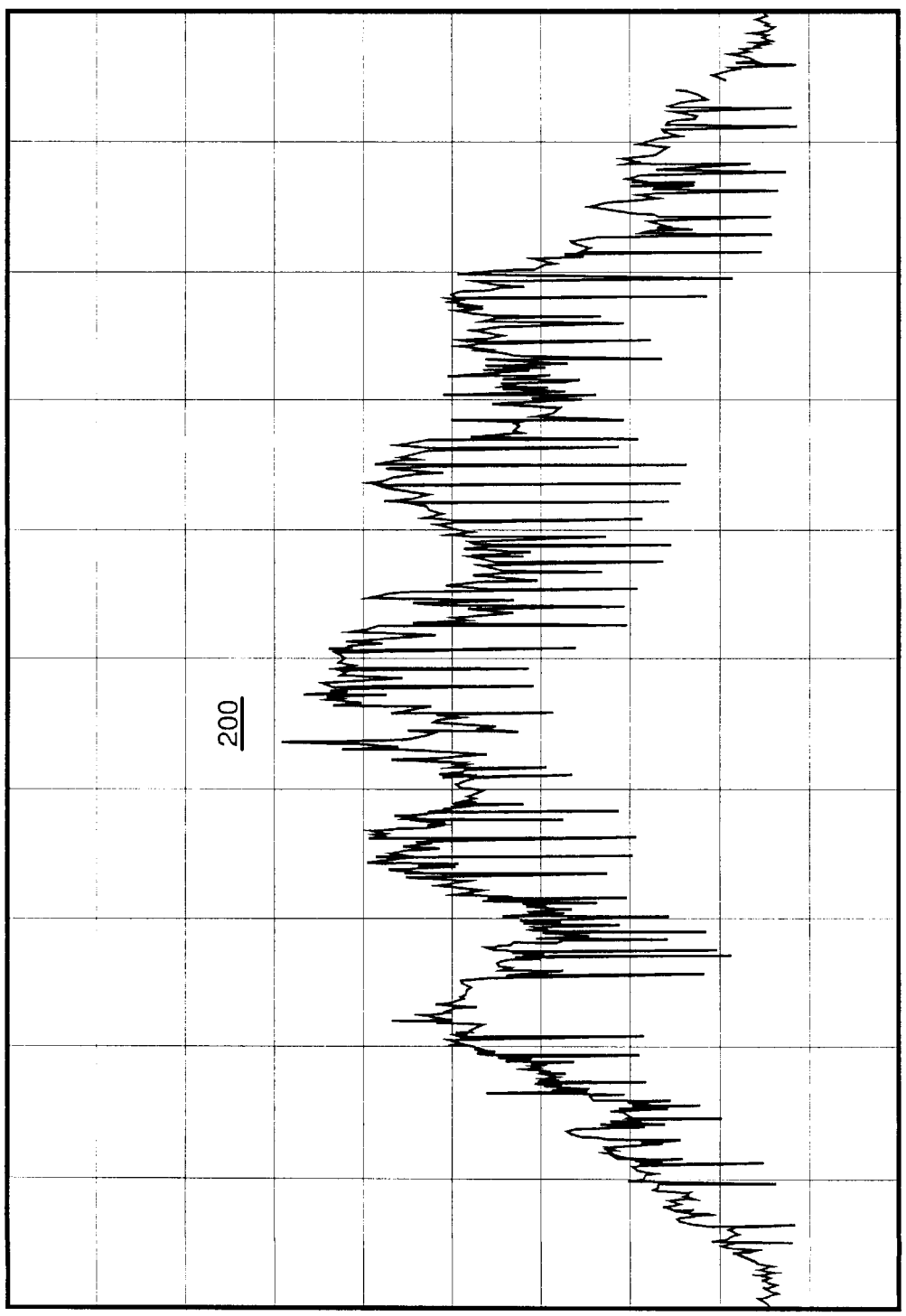
FIG. 2 is a frequency spectrum diagram of an exemplary analog information signal.

FIG. 2 is a frequency spectrum diagram of an exemplary analog information signal 200 received on terminal 101. In the grid shown in FIG. 2, each box represents 2.5 megahertz along the x-axis and 10 dB of amplitude along the y-axis. In this example, signal 200 includes an NTSC analog television signal spanning a 25 megahertz bandwidth and shown in baseband. NTSC analog television signals refer to analog television signals formatted consistent with current requirements of the NTSC. The phrase "analog information signal" refers to an electromagnetic signal transmitting information in analog form. Examples of analog information signals include, but are not limited to, to the following: analog television signals, NTSC analog television signals, analog audio signals, analog video signals, and analog video plus audio signals.

Figure 3:
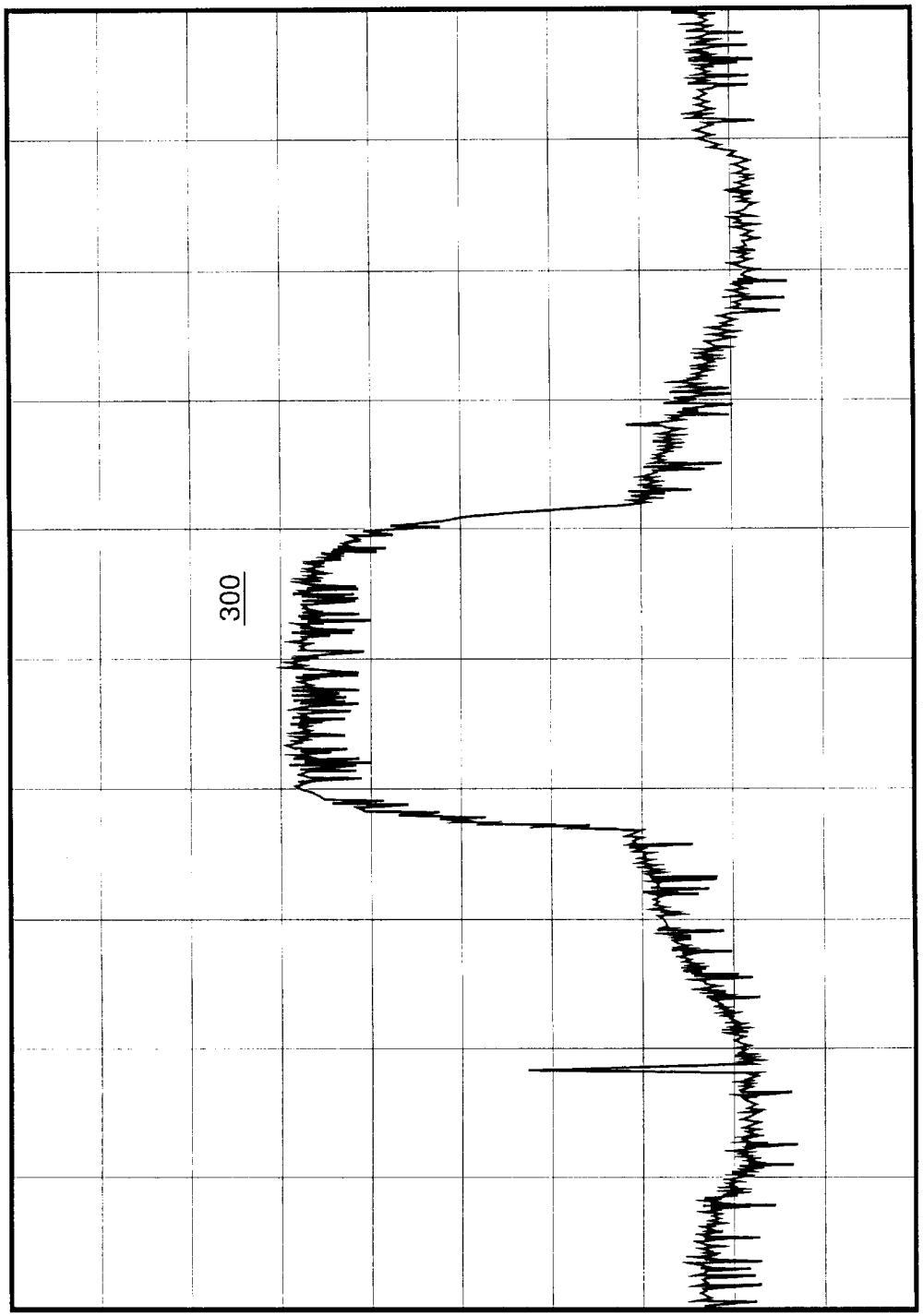
FIG. 3 is a frequency spectrum diagram of an exemplary digital information signal.

FIG. 3 is a frequency spectrum diagram of an exemplary digital information signal. In the grid shown in FIG. 3, each box represents 2.5 megahertz along the x-axis and 10 dB of amplitude along the y-axis. In this example, signal 300 includes an HDTV signal spanning a 25 megahertz frequency bandwidth. Signal 300 may be provided from an industry standard 20 megabits/second modem, compressed from a direct data stream output of an HDTV camera. HDTV signals refer to digital television signals formatted consistent with current requirements of the Advanced Television Standards Committee (ATSC). The phrase "digital information signal" refers to an electromagnetic signal transmitting information in digital form. Examples of digital information signals include, but are not limited to, the following: HDTV signals, SDTV signals, digital data signals, and signals transmitted on T1 lines.

Figure 4:
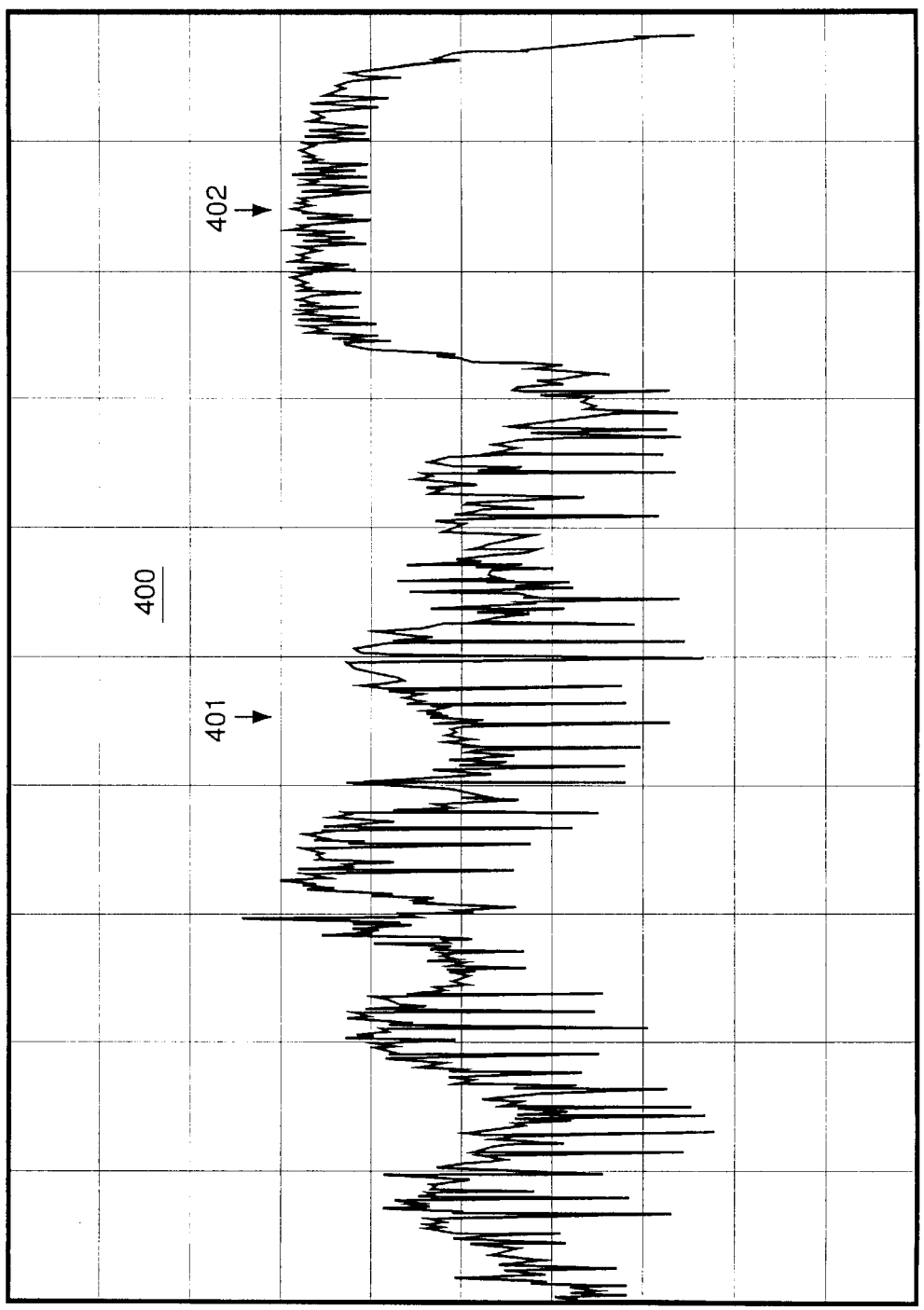
FIG. 4 is a frequency spectrum diagram of an exemplary common transport signal including analog and digital information signals.

FIG. 4 is a frequency spectrum diagram of an exemplary common transport signal 400 including analog and digital information signals transmitted on terminal 103. In the grid shown in FIG. 4, each box represents 2.5 megahertz along the x-axis and 10 dB of amplitude along the y-axis. Signal 400 is shown spanning a 25 megahertz bandwidth, providing an advantage of using the same channel bandwidth as the analog and digital information signals; alternatively, it may span a different channel bandwidth. Signal 400 includes a first portion 401 corresponding to analog information signal 200 and a second portion 402 corresponding to digital information signal 300. In order to fit both the analog and digital information signals in the same channel bandwidth in this example, analog information signal 200 is bandpass filtered in order to band limit portions of the ends of its frequency spectrum and produce signal 401. An NTSC analog television signal typically does not occupy the entire 25 megahertz channel bandwidth and therefore portions of the ends of the signal may be limited without sacrificing picture quality, permitting the NTSC analog television signal and digital information signal to both fit with the same standard television signal bandwidth. Alternatively, different channel bandwidths and types of analog and digital information signals (potentially occupying different bandwidths) may be transmitted using transmitter 100. Although transmitter 100 typically transmits common transport signal 400 as an RF signal, it may alteratively transmit it within a different portion of the frequency spectrum.

Figure 5:
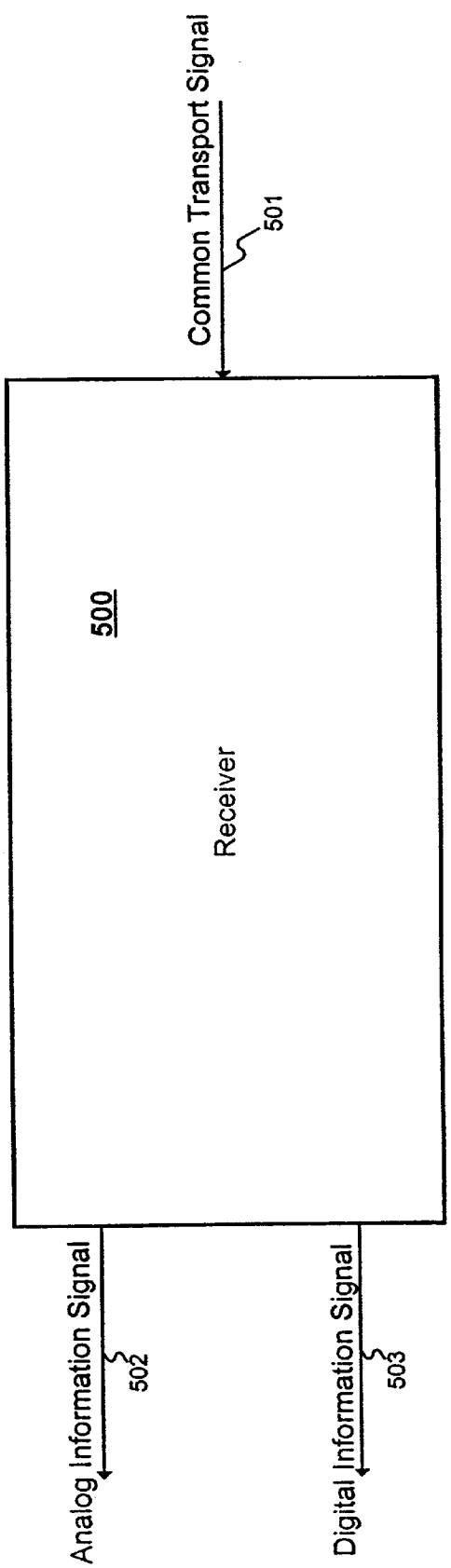
FIG. 5 is a diagram of a receiver for receiving a common transport signal including analog and digital information signals.

FIG. 5 is a diagram of a receiver 500 for receiving a common transport signal including analog and digital information signals. Receiver 500 receives a common transport signal on terminal 501 and separates the analog and digital information signals, outputting one or more analog information signals on terminal 502 and one or more digital information signals on terminal 503. The common transport signal received on terminal 501 may correspond to, for example, signal 400 shown in FIG. 4, and the analog and digital information signals output on terminals 502 and 503 may correspond, respectively, to NTSC analog television signal 200 shown in FIG. 2 and to HDTV signal 300 shown in FIG. 3. Receiver 500 may alternatively receive common transport signals having different types of analog and digital information signals and potentially occupying different bandwidths, and it may separate and output those signals. Also, although receiver 500 typically receives a common transport signal as an RF signal, it may alternatively receive the common transport from a different portion of the frequency spectrum.

Accordingly, transmitter 100 and receiver 500 permit broadcasters, for example, to transmit analog television signals with digital information signals in a standard channel. Broadcasters may use transmitter 100 in a studio-to-transmitter link (STL). STL's are used to transmit television or other information signals from a broadcast studio to a television transmit site, which in turn transmits the signals for reception by consumers' televisions. The analog television signals may be generated in the studio or transmitted from a broadcast vehicle to the studio.

Broadcasters may use receiver 500 on the transmitter side of an STL located at or proximate the television transmit site. In that situation, receiver 500 receives a common transport signal, and it separates the analog and digital information signals for transmission to consumers' televisions. The analog and digital information signals typically require different transmitters for transmission to consumers televisions, in which case separating of the signals is necessary. In addition receiver 500 may also transmit the separated analog and digital information signals back to the studio from which the corresponding common transport signal was received. That communication is referred to as a transmitter-to-studio link (TSL). Transmitting the signals in a TSL provides a broadcaster with the signals it transmitted to the antenna and thus permits a broadcaster to receive feedback concerning the transmitted signals.

Transmitter

Figure 6:
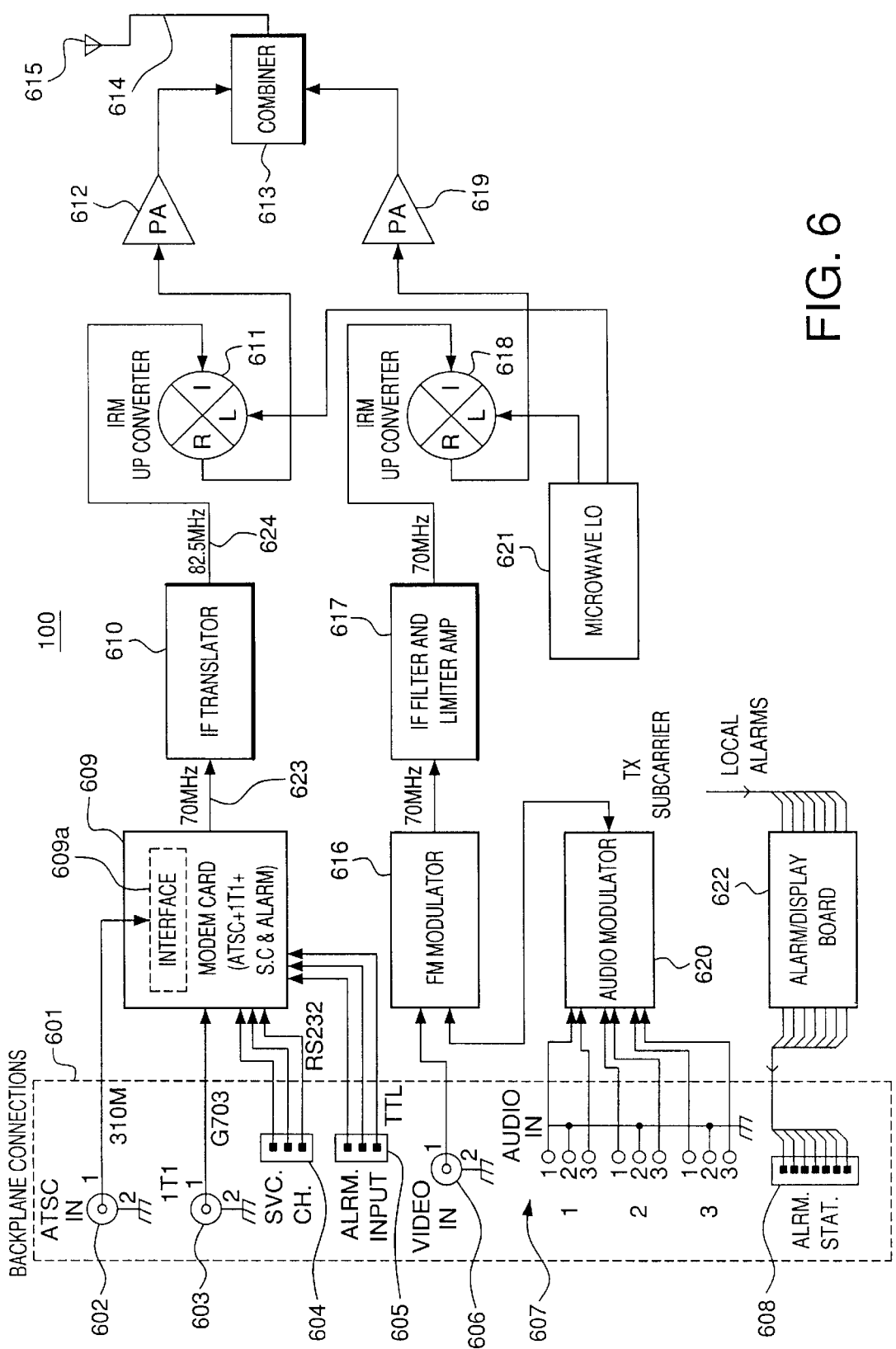
FIG. 6 is an exemplary block diagram of the transmitter shown in FIG. 1.

FIG. 6 is an exemplary block diagram of transmitter 100. The block diagram shown in FIG. 6 is only one example of components for implementing a transmitter consistent with the present invention, and other types of components and configurations are possible for implementations consistent with the present invention. Transmitter 100 receives analog and digital information signals and processes them for transmission within a particular bandwidth or channel. A backplane 601 in transmitter 100 includes terminals for receiving analog and digital information signals. A terminal 602 receives an optional ATSC signal, one type of digital information signal. Typically, that signal may include an HDTV signal having data plus a clock signal; alternatively, it may include an SDTV signal. A terminal 603 includes an optional T1 (1T1) connection and receives a data stream from the T1 connection. A T1 connection, known in the art, is a dedicated line used, for example, by private networks and for providing a high-speed link to and from an Internet service provider. Such a data stream may be used, for example, by a broadcast studio for particular management functions relating to the transmitter. A terminal 604 is a service channel and receives signals on a standard RS-232 communication link; RS-232 is a known standard for serial transmission of information between computers and peripheral devices. A terminal 605 is an alarm input that monitors conditions external to the transmitter and provides a binary signal indicating an alarm or no alarm. For example, the alarms may indicate particular environmental conditions such as a temperature too high for optimum operation of the transmitter, or the alarms may implement a burglar alarm, indicating a breach of security related to the transmitter.

A terminal 606 receives an analog information signal, typically an NTSC analog video signal. Terminals 607 receive an audio signal corresponding to the video signal received at terminal 606 and optionally receive other audio signals as well. The three audio signals at terminals 607 each include three terminals, a ground connection and a balanced input connection. An alarm status terminal 608 receives signals indicating alarms internal to the transmitter to implement, for example, what is known as a "hot standby" feature, involving use of redundant transmitters and receivers. In operation using hot standby, if a transmitter or receiver fails, as detected by an internal alarm, the radio automatically switches over to the standby transmitter or receiver to continue operating and avoid a loss of the corresponding signal.

The following components combine and process received digital information signals. A modem card 609 receives digital information signals from terminals 602–605. It includes an interface 609a which conditions the digital information signal to generate a common output; for example, it extracts the data from the digital information signal and converts it to a transistor transistor logic (TTL) signal, and it inputs the clock signal to modem card 609 to synchronize frames of the digital information signal. Modem card 609 combines all signals from terminals 602–606 into one signal using a multiplexing function, and it modulates the combined signal to a 70 megahertz intermediate (IF) frequency, an industry standard for television signals. Therefore, the output of modem card 609 is one data stream centered at 70 megahertz, signal 623. Modem card 609 uses quadrature amplitude modulation (QAM), a known technique, to generate the modulated signal. An IF translator 610 receives 70 megahertz signal 623 and shifts it to a corresponding signal 624 centered at 82.5 megahertz. The functions of IF translator 610 are further explained below.

An image reject mixer (IRM) up converter 611 receives the signal from IF translator 610 and converts it to an RF frequency. Up converter 611 is controlled by a microwave local oscillator 621, which provides the carrier signal for modulation. Up converter 611 includes an "I" (IF) terminal for receiving the 82.5 megahertz IF signal from module 610, an "L" terminal for receiving the local oscillator signal from microwave local oscillator 621, and an "R" (RF) terminal at which it outputs a corresponding up converted RF signal. Microwave local oscillators are known in the art and examples include those devices manufactured by Microlambda, Inc. Microwave local oscillator 621 typically includes a variable local oscillator signal for varying the up conversion frequency. The RF signal output from up converter 611 is transmitted through a power amplifier (PA) 612, which provides a particular amount of gain, 30 dB in this example. Power amplifiers are known in the art and examples include devices manufactured by Aydin and Fujitsu.

A power combiner 613 receives the modulated and processed digital information signal output from power amplifier 612 and combines it with a processed analog information signal. A power combiner is a resistive network used to add together signals, typically implemented by using a power splitter and reversing the connections for the input and output signals. Power splitters are known components for receiving one signal and dividing it into two signals having the same frequency response as the input signal but usually reduced in amplitude. Therefore, by reversing the connections the power splitter functions as a power combiner, receiving two signals and adding them together.

A waveguide 614 receives the output of power combiner 613 and transmit it to an antenna 615 for RF transmission as an electromagnetic signal.

The following components process and provide analog information signals to power combiner 613. An FM modulator 616 receives an analog information signal from terminal 606, receives three audio subcarriers from an audio modulator 620, and modulates those four signals into one carrier centered at 70 megahertz. Audio modulator 620 receives the three audio signals in baseband from terminals 607 and modulates each audio input signal onto a separate subcarrier. In this example, audio modulator 620 modulates audio signals onto subcarriers centered at 6.2 megahertz, 6.8 megahertz, and 7.5 megahertz. Therefore, FM modulator 616 outputs a 70 megahertz IF signal for the received analog information signals.

An IF filter and limiter amp 617 includes a standard bandpass filter, which band limits the IF spectrum of the 70 megahertz signal to fit, in this example, within a standard RF transmission channel. Therefore, it outputs a signal centered at 70 megahertz and having a 15 megahertz bandwidth for this example. The amplification function of filter 617 attempts to provide 10 dB of gain in order to amplitude limit the signal and produce an FM output signal. Bandpass filters having varying transfer characteristics may be used to filter the signal if different channel bandwidths are used.

The output of filter 617 is transmitted to an up converter 618, which typically functions in a similar manner as up converter 611. Up converter 618 receives the 70 megahertz analog information signal from filter 617 and, using a carrier signal received from microwave local oscillator 621, converts the signal to an RF frequency. Up converter 618 outputs the modulated signal to a power amplifier 619, which typically functions in a similar manner as power amplifier 612, providing a particular amount of gain, 30 dB in this example. Examples of components for implementing power amplifiers are provided above. Up converters 611 and 618 may be implemented with mixers, which are known in the art.

The output of power amplifier 619 provides the analog information portion for combination with the digital information portion by power combiner 613. Accordingly, if the analog and digital information signals include, respectively, an NTSC analog television signal and an HDTV signal, the output of power combiner 613 would typically resemble the spectrum shown in FIG. 4, each signal having its own carrier signal, having been shifted by the mixers to an RF channel frequency, and having been added together by power combiner 613. The position of the analog and digital information signals within the channel may be reversed such that the digital information signal is at the lower frequency portion of the spectrum. Although transmitter 100 is shown as first separately modulating the input analog and digital information signals to an RF frequency and then combining the modulated signals, it may alternatively first combine the signals and then up convert the combination to an RF or other transmission frequency.

An alarm display board 622 receives the local internal alarms and transmits them via a ribbon cable to an LCD display. The LCD display may be located on or proximate the transmitter for indicating and displaying the internal alarms.

Figure 7:
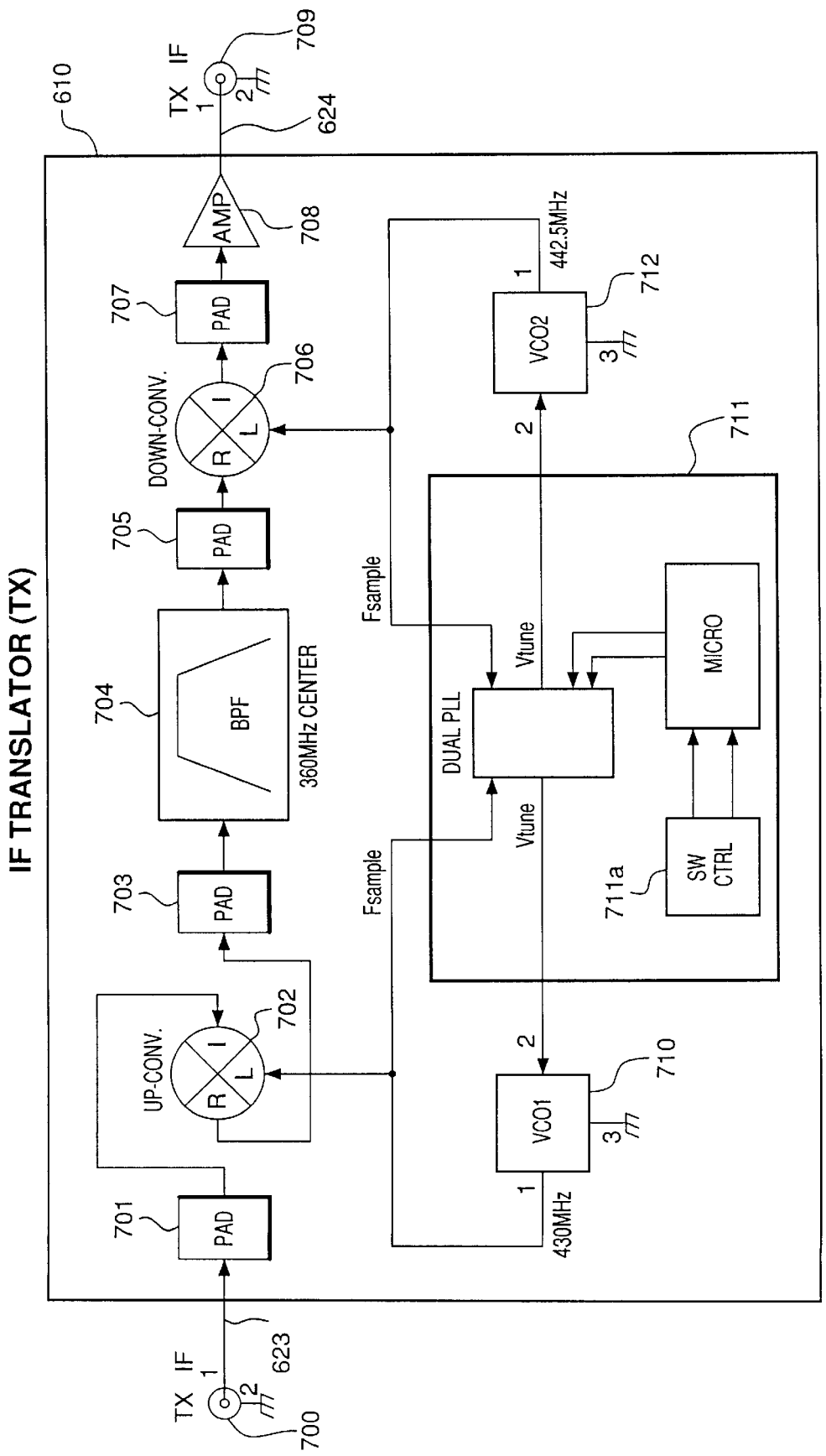
FIG. 7 is an exemplary block diagram of an IF translator shown in FIG. 6.
Figure 8:
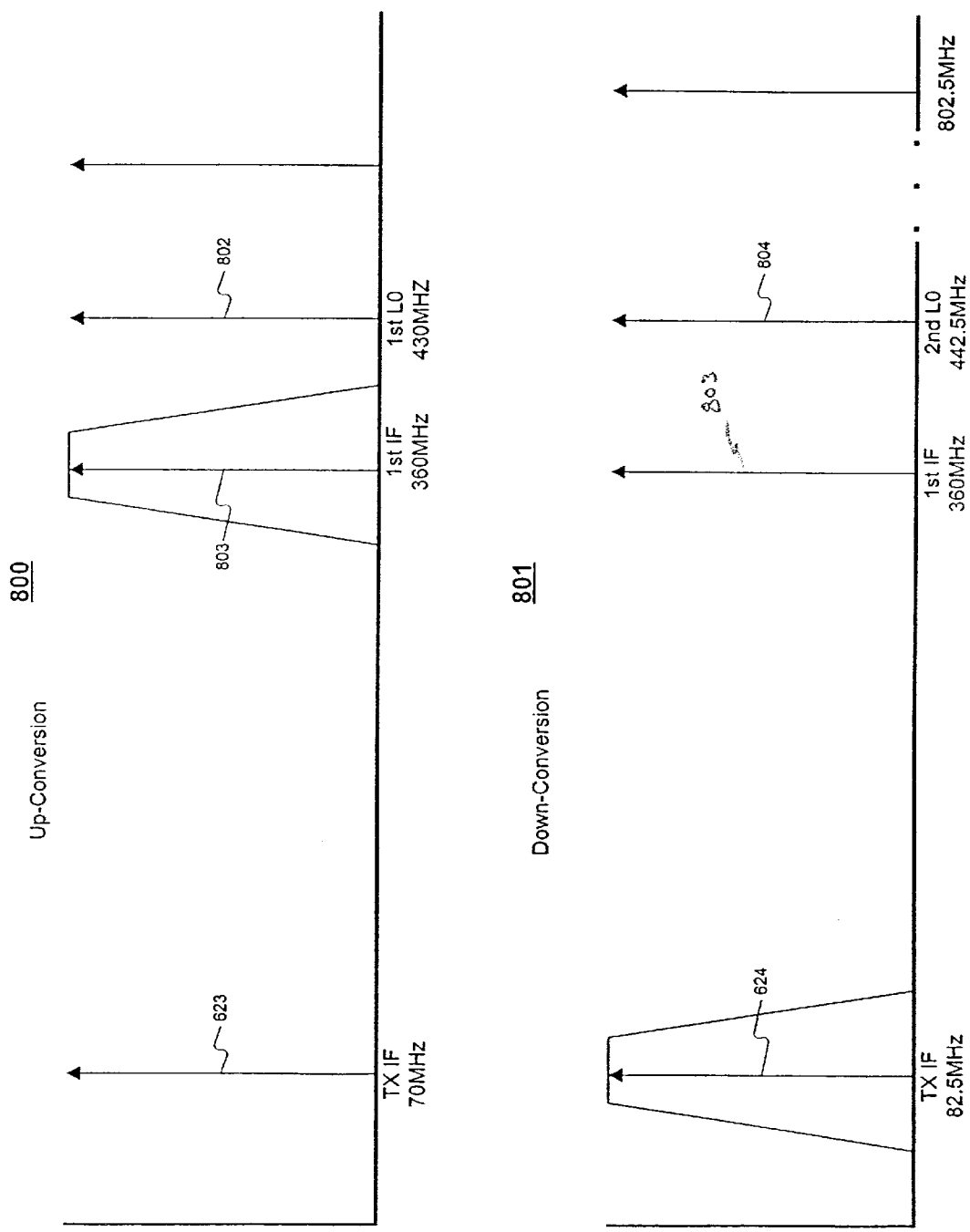
FIG. 8 is a frequency diagram of signals within the IF translator shown in FIG. 7.

FIG. 7 is a block diagram of IF translator 610 in transmitter 100. IF translator 610 functions to convert signal 623 centered at 70 megahertz to signal 624 centered at 82.5 megahertz. Because these two signals are close in frequency, a simple conversion from 70 megahertz to 82.5 megahertz would result in interference from harmonics produced during the conversion. Therefore, IF translator 610 performs an up conversion in order to isolate the signal and subsequently performs a down conversion in order to shift the signal back to 82.5 megahertz. This process is further explained with respect to FIG. 8 illustrating frequency spectrum diagrams of signals within IF translator 610.

IF translator 610 receives signal 623 at terminal 700, and transmits it through a pad 701 to an up converter 702. Pad 701, as well as other pads 703, 705, and 707 within IF translator 610, are implemented with resistive elements to ensure matching of resistance between components to optimize performance of the circuit. An up converter 702 receives signal 623 and mixes it with a local oscillator signal received from a voltage controlled oscillator 710. In this example, signal 623 is mixed with a 430 megahertz IF signal, the result of which is shown in graph 800 (FIG. 8). Mixing signal 623 with the local oscillator signal produces a carrier signal 802 centered at 430 megahertz and also produces the sum and difference of the signals. The difference of the signals is a side band produced at 360 megahertz, as shown by signal 803. A bandpass filter 704 receives the 430 megahertz carrier signal along with the resulting side bands, and the filter is centered at 360 megahertz to extract signal 803 and reject the other signals. Bandpass filter 704 may be implemented, for example, with a filter manufactured by Toko.

A down converter 706 receives the output of band pass filter 704 and mixes it with a local oscillator in order to down convert the signal to an 82.5 megahertz IF frequency. A voltage controlled oscillator 712 provides the local oscillator signal for down converter 706, in this example a 442.5 megahertz signal. This operation is shown in graph 801. Down converter 706 mixes the second local oscillator signal 804 with the 360 megahertz signal 803, producing the difference between the two, signal 624 centered at 82.5 megahertz. Up converter 702 and down converter 706 may be implemented with mixers, which are known in the art.

Signal 624, output from down converter 706, is transmitted through an amplifier 708 in order to compensate for loss through the circuitry and is output to terminal 709. Amplifier 708 provides sufficient amplification such that, in this example, signal 623 at input terminal 700 has an amplitude of approximately −10 dBm and signal 624 at output terminal 709 has an amplitude of approximately −3 dBm, providing for 7 dB of gain through IF translator 610.

A dual phase lock loop (PLL) 711 synchronizes and controls voltage controlled oscillators 710 and 712. It samples the outputs of voltage controlled oscillators 710 and 712 (signals Fsample) and outputs corresponding control signals (signals Vtune). PLL 711 includes a switch control 711a, such that a user's setting of the switches is converted into a signal on one line, controlling the output. Dual PLLs are known in the art and may be implemented, for example, using the National Semiconductor dual PLL part number LMX2335. IF translator 610 typically always up converts to 360 megahertz but may down convert to different frequencies, as specified by switch control 711a, in order to swap positions of the analog and digital information signals within the channel. If the signals are switched in position, microwave local oscillator 621 may be adjusted in order to ensure centering of a common transport signal within a particular channel bandwidth.

Receiver

Figure 9:
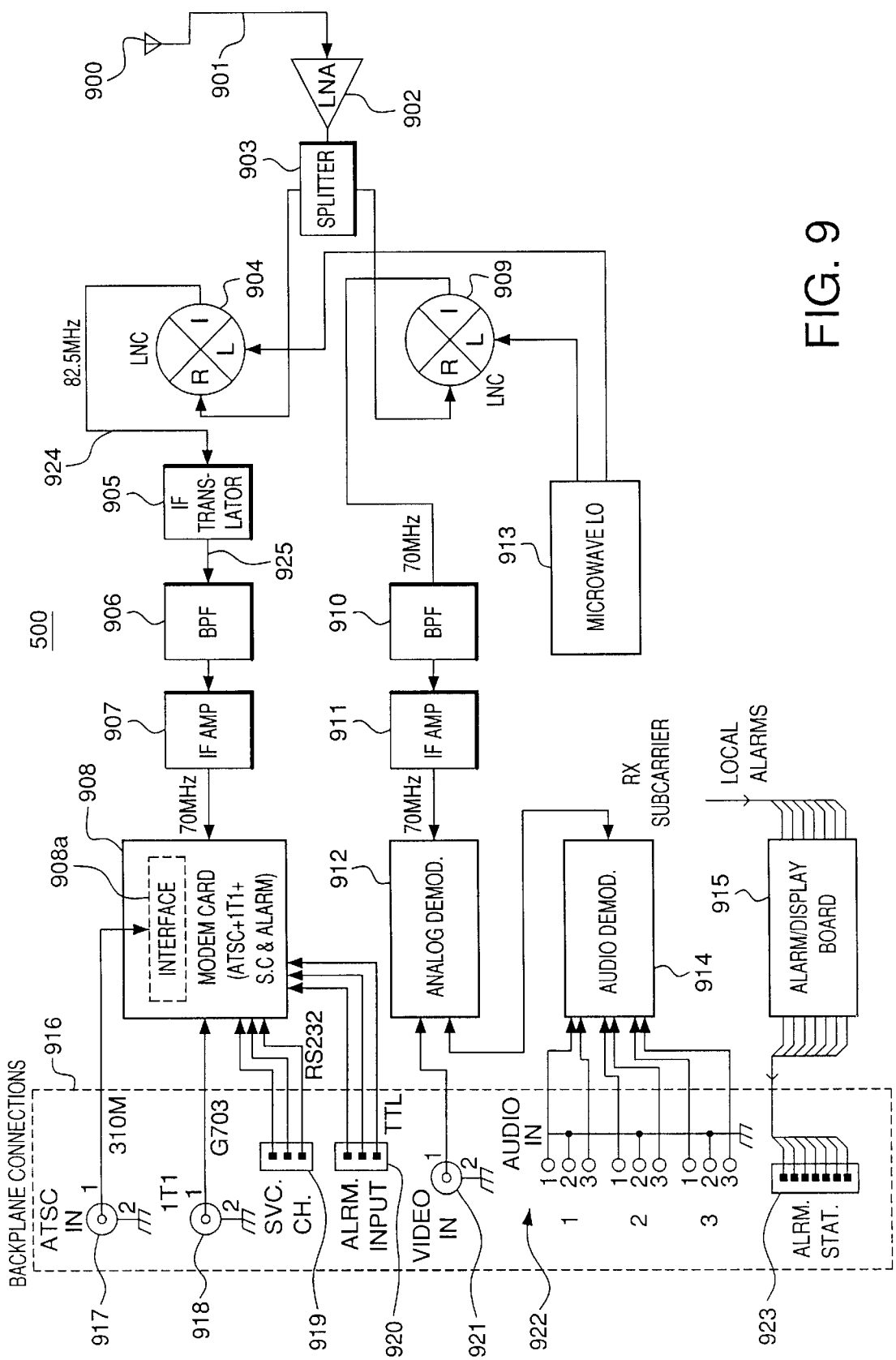
FIG. 9 is an exemplary block diagram of the receiver shown in FIG. 5.

FIG. 9 is a block diagram of receiver 500. The block diagram shown in FIG. 9 is only, one example of components for implementing a receiver consistent with the present invention, and other types of components and configurations are possible for implementations consistent with the present invention. Receiver 500 receives a common transport signal at antenna 900. The common transport signal is an electromagnetic signal typically transmitted as RF signal, although it may alternatively be received from other portions of the frequency spectrum. The received signal includes a digital information signal portion and an analog information signal portion and may resemble, for example, the common transport signal shown in FIG. 4. A waveguide 901 transmits the received signal to a low noise amplifier (LNA) 902, providing gain to compensate for loss in a splitter 903; in this example, it provides 10 dB of gain. Splitter 903 is a resistive network which separates one signal into two corresponding signals; therefore, splitter 903 outputs two signals each having the same frequency spectrum as the input signal of splitter 903 but reduced in amplitude. One of the signals from splitter 903 is transmitted to a low noise converter (LNC) 904, which converts the RF signal to a signal 924 centered at 82.5 megahertz using a signal received from a microwave local oscillator 913.

An IF translator 905 receives the 82.5 megahertz signal 924 and shifts it to a corresponding signal 925 centered at 70 megahertz. The functions of IF translator 905 are further explained below.

The 70 megahertz signal 925 is transmitted through a bandpass filter 906, which may be implemented, for example, using a standard filter centered at 70 megahertz and having a 10 megahertz bandwidth to reject the analog component and isolate the digital IF signal. An IF amplifier 907 receives the isolated digital IF signal and provides an output having a constant amplitude using automatic gain control. In this example, IF amplifier 907 provides an output having a constant 5 dBm amplitude. Amplifiers having automatic gain control are known in the art. A modem card 908 receives the 70 megahertz output of amplifier 907 at a constant amplitude and demodulates the digital information signal using a 70 megahertz demodulation signal and transmits the demodulated signal to an interface 908a, which combines frames in the digital information signal with a clock signal in the corresponding signal.

Modem card 908 also separates other types of digital information signals using the 70 megahertz demodulation signal. Therefore, the demodulated signals are output to a backplane 916, including an HDTV or other such signal transmitted to an ATSC terminal 917, a data stream transmitted to a Ti connection 918, an RS-232 signal transmitted to a service channel 919, and alarm outputs transmitted to terminal 920 (including three contact closures for each alarm output). These signals correspond with the signals described with respect to backplane 601 in transmitter 100.

Figure 10:
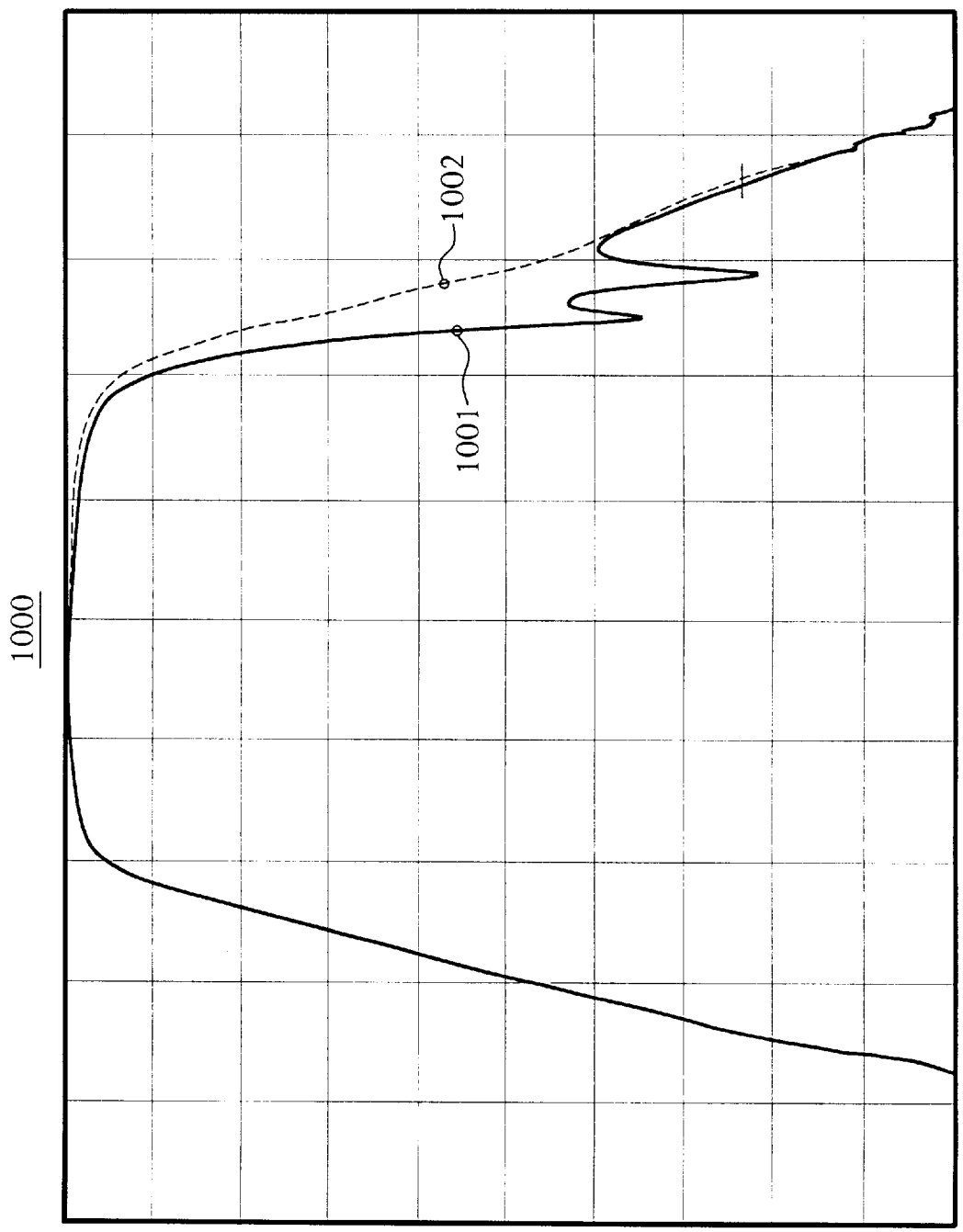
FIG. 10 is a diagram of a frequency response of a bandpass filter for filtering an analog information signal in the receiver shown in FIG. 9.

The other output from splitter 903 is transmitted to another low noise converter 909, which uses the same oscillation signal from microwave local oscillator 913 to demodulate the analog component of the signal to a 70 megahertz IF signal. LNCs 904 and 909 may be implemented with mixers in series with low noise amplifiers, all of which are known in the art as an LNC. A bandpass filter 910 receives the 70 megahertz analog signal and provides a particular type of band limiting to separate and isolate the analog IF signal from the digital information signal. In particular, it provides filtering so that the digital information signal, such as an HDTV signal, does not interfere with the analog signal. The transfer characteristic of bandpass filter 910 is shown in FIG. 10. In this example, transfer characteristic 1000 is shown with a "notch" 1001 in order to provide particular band limiting of the analog information signal. The dashed line 1002 approximates how the filter would function as a standard band pass filter without the notch. Bandpass filter 910 band limits the 70 megahertz signal by rejecting information between notch 1001 and dashed line 1002. Notch 1001 is shown on the side of the spectrum adjacent the digital information signal. If the digital and analog information signals were switched in position, the notch 1001 may be located on the other side of transfer characteristic 1000. Given a particular transfer characteristic, it is known in the art how to generate the corresponding bandpass filter. If different types of digital information signals are received, this particular band limiting may not necessarily be required, in which case a standard bandpass filter may be used. Alternatively, other types of bandpass filters having particular band limiting may be used depending upon the frequency response of the received signals.

An IF amplifier 911 receives the output of band pass filter 910 and provides an output having a constant amplitude using automatic gain control. In this example, IF amplifier 911 provides an output having a constant 5 dBm amplitude. An analog demodulator 912 receives the 70 megahertz signal at a constant amplitude and separates the analog video signal from the audio subcarriers using a 70 megahertz demodulation signal. Audio demodulator 914 receives the audio subcarrier signals from audio demodulator 912 provides demodulation at the same frequencies as modulator 620 in order to demodulate the three audio signals. Accordingly, the analog video signal is output to terminal 921 in backplane 916, and the demodulated audio signals are output to terminals 922.

An alarm display board 915 functions in the same manner as alarm display board 622 and provides alarm status signals at alarm status terminal 923, presented on an LCD display.

Figure 11:
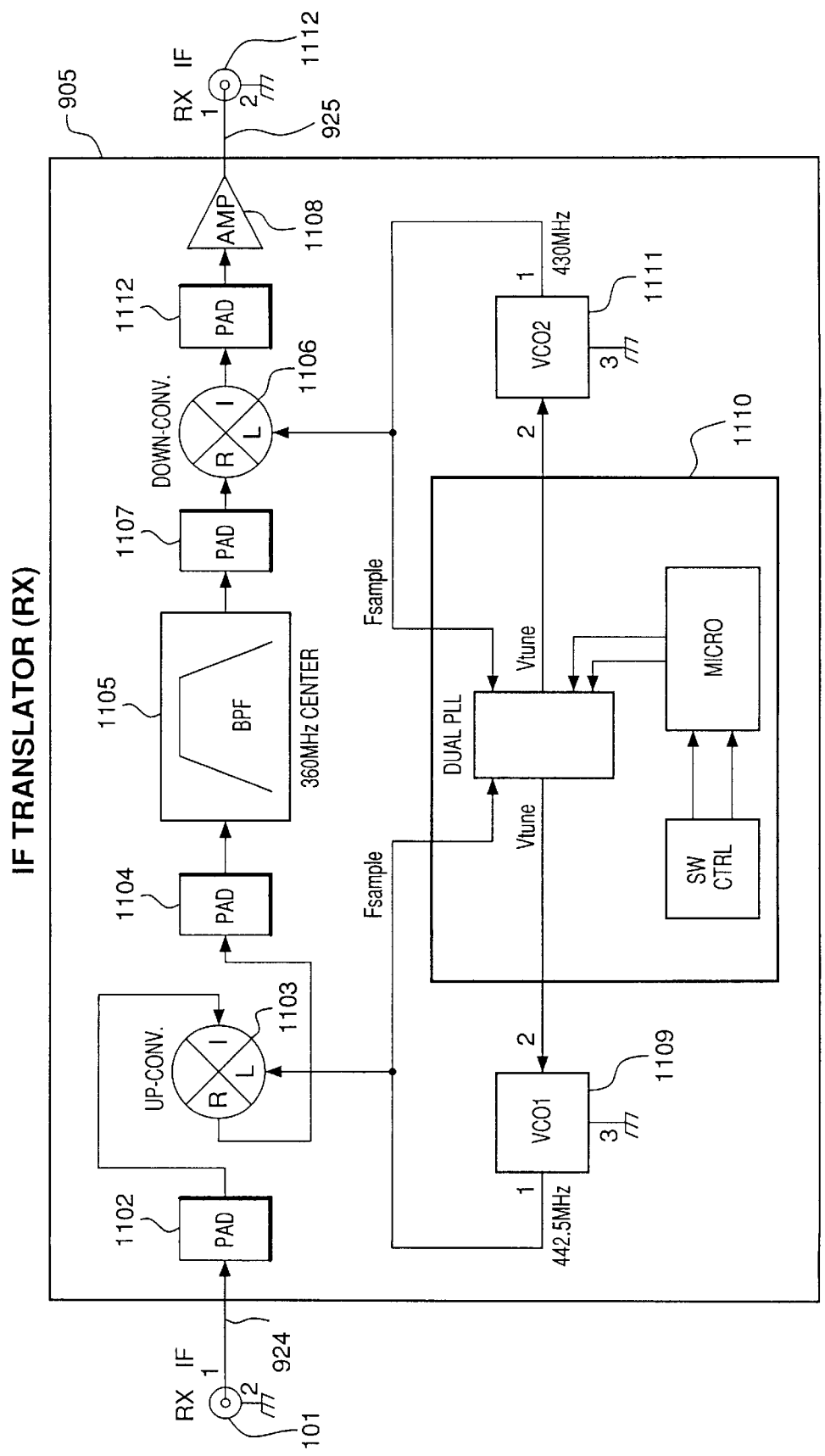
FIG. 11 is an exemplary block diagram of an IF translator shown in FIG. 9.

FIG. 11 is a block diagram of IF translator 905 in receiver 500. IF translator 905 functions in a similar manner as IF translator 610. It uses different local oscillator frequencies, however, to shift an 82.5 megahertz signal to a 70 megahertz signal using an up conversion and down conversion, as Further illustrated by the signal frequency diagrams m FIG. 12. At terminal 1101, IF translator 905 receives signal 924 at 82.5 megahertz. An up converter 1103 receives the 82.5 megahertz signal from pad 1102 and mixes it with a 442.5 megahertz local oscillator frequency received from a voltage controlled oscillator 1109. Pad 1102, as well as other pads 1104, 1107, and 1112 within IF translator 905, are implemented with resistive elements to ensure matching of resistance between the components to optimize performance of the circuit.

Figure 12:
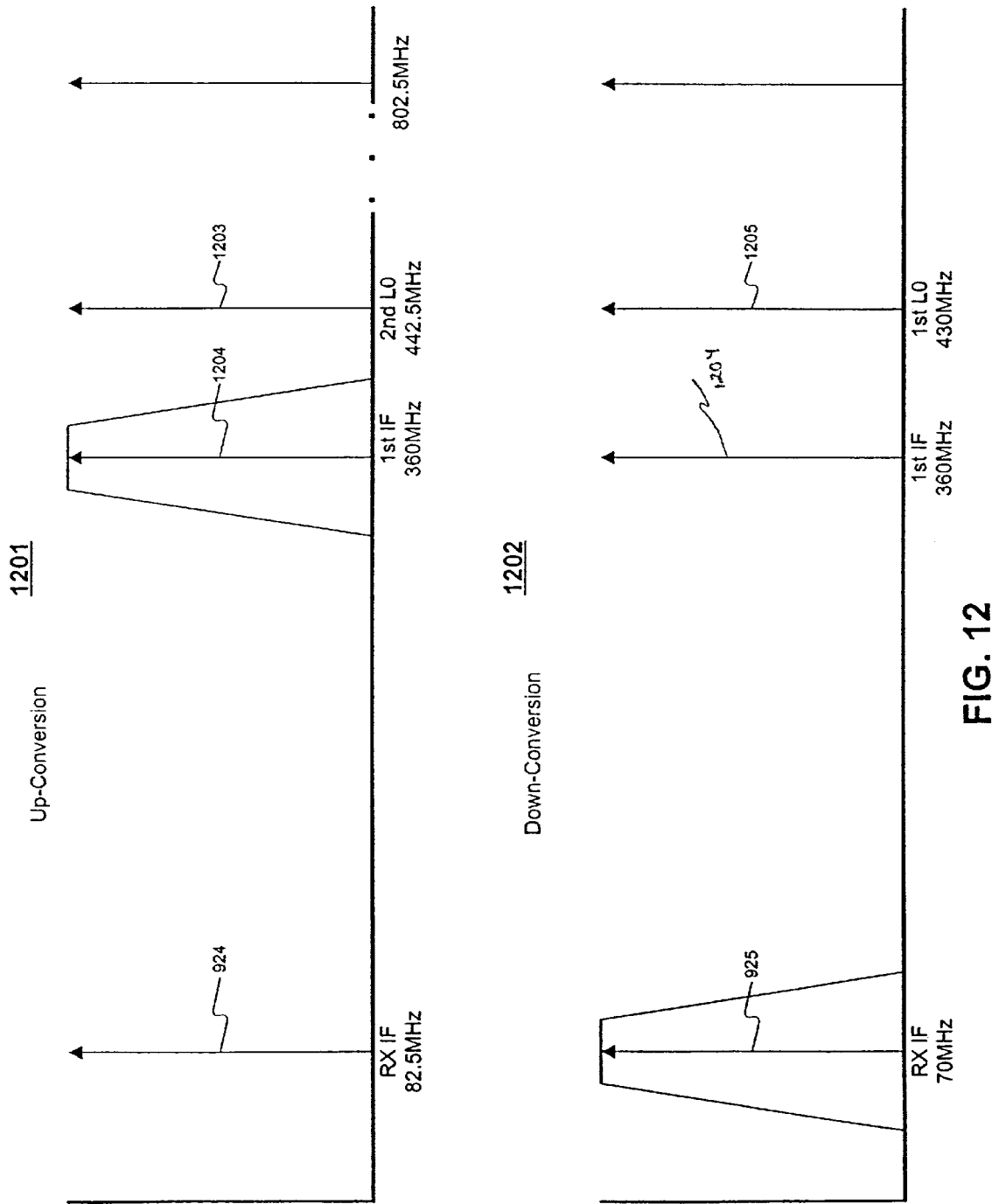
FIG. 12 is a frequency diagram of signals within the IF translator shown in FIG. 9.

Diagram 1201 in FIG. 12 illustrates the output of up converter 1103. Signal 924 is mixed with signal 1203 providing the sum and the difference. In particular, a side band is located at 360 megahertz as illustrated by signal 1204, representing the difference between signals 924 and 1203. The output of up converter 1103 is transmitted through a bandpass filter 1105 centered at 360 megahertz in order to isolate signal 1204 and reject other signals. A down converter 1106 receives the 360 megahertz signal and mixes it with a 430 megahertz local oscillator signal 1205 received from a voltage controlled oscillator 1111. This down conversion is further illustrated in diagram 1202. When signal 1204 is mixed with a 430 megahertz local oscillator frequency 1205, both the sum and the difference are produced, and the difference is signal 925 centered at 70 megahertz. Up converter 1103 and down converter 1106 may be implemented with mixers, which are known in the art.

The signal from down converter 1106 is transmitted through pad 1112 to an amplifier 1108 providing amplification to compensate for loss within IF translator 905 and is output as signal 925 to terminal 1112. In particular, amplifier 1108 provides sufficient amplification such that, in this example, signal 924 at input terminal 1101 has an amplitude of approximately −10 dBm and signal 925 at output terminal 1112 has an amplitude of approximately −3 dBm, providing for 7 dB of gain through IF translator 905. Voltage control oscillators 1109 and 1111 are controlled by a dual PLL 1110, which operates in a similar manner, and may be implemented with the exemplary component, as described with respect to dual PLL 711.

While the present invention has been described in connection with an exemplary embodiment, it will be understood that many modifications will be readily apparent to those skilled in the art, and this application is intended to cover any adaptations or variations thereof. For example, different types of components, different types of signals, varying amounts of modulation and amplification, and various hardware embodiments for the signal processing may be used without departing from the scope of the invention. This invention should be limited only by the claims and equivalents thereof.

What is claimed is:

1. A method of transmitting combined analog and digital information signals, comprising:
   receiving an analog information signal;
   receiving a digital information signal; and
   combining the analog information signal and the digital information signal for transmission within a particular frequency bandwidth while maintaining the analog information signal in analog form.

2. The method of claim 1 wherein the receiving an analog information signal includes
   receiving at least one of an analog video signal, an NTSC analog television signal, and an analog audio signal.

3. The method of claim 1 wherein the receiving a digital information signal includes
   receiving at least one of a digital television signal and a data signal.

4. The method of claim 1 wherein the combining includes:
   shifting a frequency spectrum of the analog information signal;
   shifting a frequency spectrum of the digital information signal; and
   adding the shifted analog information signal and the shifted digital information signal.

5. The method of claim 4, further including
   filtering the analog information signal.

6. The method of claim 1 wherein the combining includes:
   shifting a frequency spectrum of the digital information signal by a first amount;
   shifting frequency spectrums of the analog information signal and the shifted digital information signal by a second amount; and
   adding the shifted analog information signal and the second shifted digital information signal.

7. The method of claim 6 wherein the second shifting includes
   using a common local oscillator to mix the analog information signal and the shifted digital information signal.

8. A method of receiving combined analog and digital information signals, comprising:
   receiving a signal, transmitted within a particular frequency bandwidth, having a first portion including an analog information signal maintained in analog form and having a second portion including a digital information signal; and
   separating the analog information signal from the digital information signal.

9. The method of claim 8 wherein the receiving includes
   receiving, within the signal, at least one of an analog video signal, an NTSC analog television signal, and an analog audio signal.

10. The method of claim 8 wherein the receiving includes
    receiving, within the signal, at least one of a digital television signal and a data signal.

11. The method of claim 8 wherein the separating includes
    splitting the signal to produce first and second carrier signals; and
    shifting frequency spectrums of the first and second carrier signals.

12. The method of claim 11, further including
    filtering the shifted first carrier signal to produce the analog information signal.

13. The method of claim 11, further including
    shifting a frequency spectrum of the shifted second carrier signal by a particular amount to produce the digital information signal.

14. The method of claim 11 wherein the shifting includes
    using a common local oscillator to mix the first and second carrier signals.

15. A method of transmitting combined analog and digital information signals, comprising:
    receiving an analog information signal;
    receiving a digital information signal; and
    combining the analog information signal and the digital information signal for transmission within a particular frequency bandwidth using a first carrier signal for the analog information signal and using a second carrier signal for the digital information signal.

16. The method of claim 15 wherein the receiving an analog information signal includes
    receiving at least one of an analog video signal, an NTSC analog television signal, and an analog audio signal.

17. The method of claim 15 wherein the receiving a digital information signal includes
    receiving at least one of a digital television signal and a data signal.

18. The method of claim 15 wherein the combining includes:
    shifting a frequency spectrum of the analog information signal;
    shifting a frequency spectrum of the digital information signal; and
    adding the shifted analog information signal and the shifted digital information signal.

19. The method of claim 18, further including
    filtering the analog information signal.

20. The method of claim 15 wherein the combining includes:
    shifting a frequency spectrum of the digital information signal by a first amount;
    shifting frequency spectrums of the analog information signal and the shifted digital information signal by a second amount; and
    adding the shifted analog information signal and the second shifted digital information signal.

21. The method of claim 20 wherein the second shifting includes
    using a common local oscillator to mix the analog information signal and the shifted digital information signal.
22. A method of receiving combined analog and digital information signals, comprising:
    receiving a signal, transmitted within a particular frequency bandwidth, having a first portion including an analog information signal transmitted using a first carrier signal and having a second portion including a digital information signal transmitted using a second carrier signal; and
    separating the analog information signal from the digital information signal.
23. The method of claim 22 wherein the receiving includes
    receiving, within the signal, at least one of an analog video signal, an NTSC analog television signal, and an analog audio signal.
24. The method of claim 22 wherein the receiving includes
    receiving, within the signal, at least one of a digital television signal and a data signal.
25. The method of claim 22 wherein the separating includes
    splitting the signal to produce first and second carrier signals; and
    shifting frequency spectrums of the first and second carrier signals.
26. The method of claim 25, further including
    filtering the shifted first carrier signal to produce the analog information signal.
27. The method of claim 25, her including
    shifting a frequency spectrum of the shifted second carrier signal by a particular amount to produce the digital information signal.
28. The method of claim 25 wherein the shifting includes
    using a common local oscillator to mix the first and second carrier signals.
29. An apparatus for transmitting combined analog and digital information signals, comprising:
    a first terminal for receiving an analog information signal;
    a second terminal for receiving a digital information signal; and
    a transmitter, coupled to the first and second terminals, for combining the analog information signal and the digital information signal for transmission within a particular frequency bandwidth while maintaining the analog information signal in analog form.
30. The apparatus of claim 29 wherein the first terminal includes
    a component for receiving at least one of an analog video signal, an NTSC analog television signal, and an analog audio signal.
31. The apparatus of claim 29 wherein the second terminal includes
    a component for receiving at least one of a digital television signal and a data signal.
32. The apparatus of claim 29 wherein the transmitter includes:
    a first up converter component shifting a frequency spectrum of the analog information signal;
    a second up converter component shifting a frequency spectrum of the digital information signal; and
    a combiner component, coupled to the first and second up converter components, adding the shifted analog information signal and the shifted digital information signal.
33. The apparatus of claim 32, further including
    a filter, coupled to the first up converter component, filtering the analog information signal.
34. The apparatus of claim 29 wherein the transmitter includes:
    a translator component shifting a frequency spectrum of the digital information signal by a first amount;
    an up converter component shifting frequency spectrums of the analog information signal and the shifted digital information signal by a second amount; and
    a combiner component, coupled to the translator and up converter components, adding the shifted analog information signal and the second shifted digital information signal.
35. The apparatus of claim 34 wherein the up converter component includes
    a common local oscillator mixing the analog information signal and the shifted digital information signal.
36. An apparatus for receiving a combined analog and digital information signal, comprising:
    a terminal for receiving a signal, transmitted within a particular frequency bandwidth, having a first portion including an analog information signal maintained in analog form and having a second portion including a digital information signal; and
    a receiver, coupled to the terminal, for separating the analog information signal from the digital information signal.
37. The apparatus of claim 36 wherein the terminal includes
    a component for receiving, within the signal, at least one of an analog video signal, an NTSC analog television signal, and an analog audio signal.
38. The apparatus of claim 36 wherein the terminal includes
    a component for receiving at least one of a digital television signal and a data signal.
39. The apparatus of claim 36 wherein the receiver includes
    a splitter component splitting the signal to produce first and second carrier signals; and
    a converter component shifting frequency spectrums of the first and second carrier signals.
40. The apparatus of claim 39, further including
    a filter, coupled to the converter component, filtering the shifted first carrier signal to produce the analog information signal.
41. The apparatus of claim 39, further including
    a translator component, coupled to the converter component, shifting a frequency spectrum of the shifted second carrier signal by a particular amount to produce the digital information signal.
42. The apparatus of claim 39 wherein the converter includes
    a common local oscillator mixing the first and second carrier signals.
43. An apparatus for transmitting combined analog and digital information signals, comprising:
    a first terminal for receiving an analog information signal;
    a second terminal for receiving a digital information signal; and a transmitter, coupled to the first and second terminals, for combining the analog information signal and the digital information signal for transmission within a particular frequency bandwidth using a first carrier signal for the analog information signal and using a second carrier signal for the digital information signal.

44. The apparatus of claim 43 wherein the first terminal includes a component for receiving at least one of an analog video signal, an NTSC analog television signal, and an analog audio signal.

45. The apparatus of claim 43 wherein the second terminal includes a component for receiving at least one of a digital television signal and a data signal.

46. The apparatus of claim 43 wherein the transmitter includes:

a first up converter component shifting a frequency spectrum of the analog information signal;

a second up converter component shifting a frequency spectrum of the digital information signal; and a combiner component, coupled to the first and second up converter components, adding the shifted analog information signal and the shifted digital information signal.

47. The apparatus of claim 46, further including a filter, coupled to the first up converter component, filtering the analog information signal.

48. The apparatus of claim 43 wherein the transmitter includes:

a translator component shifting a frequency spectrum of the digital information signal by a first amount;

an up converter component shifting frequency spectrums of the analog information signal and the shifted digital information signal by a second amount; and a combiner component, coupled to the translator and up converter components, adding the shifted analog information signal and the second shifted digital information signal.

49. The apparatus of claim 48 wherein the up converter component includes a common local oscillator mixing the analog information signal and the shifted digital information signal.

50. An apparatus for receiving combined analog and digital information signals, comprising:

a terminal for receiving a signal, transmitted within a particular frequency bandwidth, having a first portion including an analog information signal transmitted using a first carrier signal and having a second portion including a digital information signal transmitted using a second carrier signal; and a receiver, coupled to the terminal, for separating the analog information signal from the digital information signal.

51. The apparatus of claim 50 wherein the terminal includes a component for receiving, within the signal, at least one of an analog video signal, an NTSC analog television signal, and an analog audio signal.

52. The apparatus of claim 50 wherein the terminal includes a component for receiving, within the signal, at least one of a digital television signal and a data signal.

53. The apparatus of claim 50 wherein the receiver includes a splitter component splitting the signal to produce first and second carrier signals; and a converter component, coupled to the splitter component, shifting frequency spectrums of the first and second carrier signals.

54. The apparatus of claim 53, further including a filter, coupled to the converter component, filtering the shifted first carrier signal to produce the analog information signal.

55. The apparatus of claim 53, further including a translator component, coupled to the converter component, shifting a frequency spectrum of the shifted second carrier signal by a particular amount to produce the digital information signal.

56. The apparatus of claim 53 wherein the converter component includes a common local oscillator mixing the first and second carrier signals.

57. A method of transmitting an NTSC analog information signal and a digital information signal within a particular frequency bandwidth, comprising:

receiving an NTSC analog television signal;

receiving a digital information signal; and generating a common transport signal for transmission within a particular frequency bandwidth, the common transport signal including the NTSC analog television signal maintained in analog form and the digital information signal.

58. The method of claim 57 wherein the generating includes combining the NTSC analog television signal and the digital information signal for transmission within approximately a 25 megahertz channel.

59. The method of claim 57, further including filtering the NTSC analog television signal in order to band limit a portion of a frequency spectrum of the NTSC analog television signal adjacent a frequency spectrum of the digital information signal in the common transport signal.

60. The method of claim 57, further including modulating the common transport signal with a carrier signal.

61. A system for transmitting and receiving combined analog and digital information signals, comprising:

an analog information signal generator;

a digital information signal generator;

a combiner that receives the analog information signal from said analog information signal generator, and that receives the digital information signal from said digital information signal generator, wherein said combiner band limits the analog information signal, and wherein said combiner combines the digital information signal as a first combined signal portion, and the band-limited analog information signal as a second combined signal portion, within one frequency band;

a transmitter that transmits the first and second combined signal portions;

a receiver that receives the first and second combined signal portions transmitted within the one frequency band from said transmitter; and a separator that separates the first and second combined signal portions in the one frequency band from said receiver into the analog information signal and the digital information signal.

* * * * *